Oct. 16, 1928.

G. H. MILLER

WEEDING HOE

Filed May 18, 1926

1,687,986

INVENTOR

Geo. H. Miller

BY

ATTORNEY

Patented Oct. 16, 1928.

1,687,986

UNITED STATES PATENT OFFICE.

GEORGE H. MILLER, OF CHICO, CALIFORNIA.

WEEDING HOE.

Application filed May 18, 1926. Serial No. 109,827.

This invention relates to improvements in garden hoes, my principal object being to provide an implement of this character so constructed that weeds and the like may be cut through under-ground or at the root; sod may be cut and lifted, and ground around plants efficiently cultivated without danger of damaging the roots of the plants.

A further object is to arrange the parts of the hoe in such a manner relative to each other that the implement is very easy and convenient to manipulate when performing any operations for which it is intended and with but a minimum of physical exertion being necessary to so manipulate the hoe.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 2:
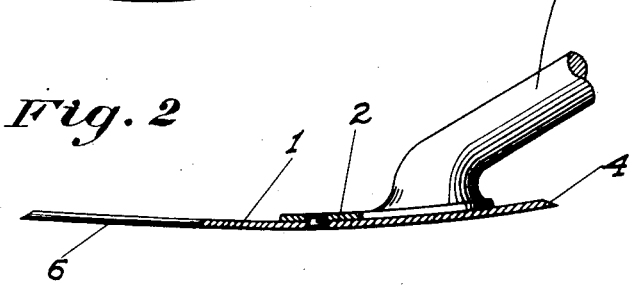
Fig. 2 is a longitudinal section of the same.
Figure 3:
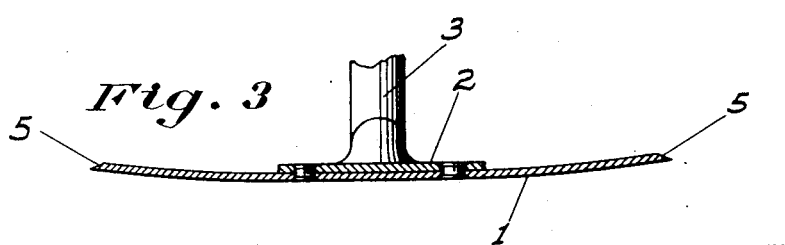
Fig. 3 is a transverse section of the hoe.

Referring now more particularly to the characters of reference on the drawings, the numeral 1 denotes the blade of the implement, a flat element having a slight concavity both longitudinally and transversely, as shown in Figs. 2 and 3 respectively. Fixed on the blade centrally of the width thereof and a certain distance from the rear edge is a pad 2 from which a handle 3 projects rearwardly and upwardly at an acute angle preferably about thirty degrees to the blade.

Figure 1:
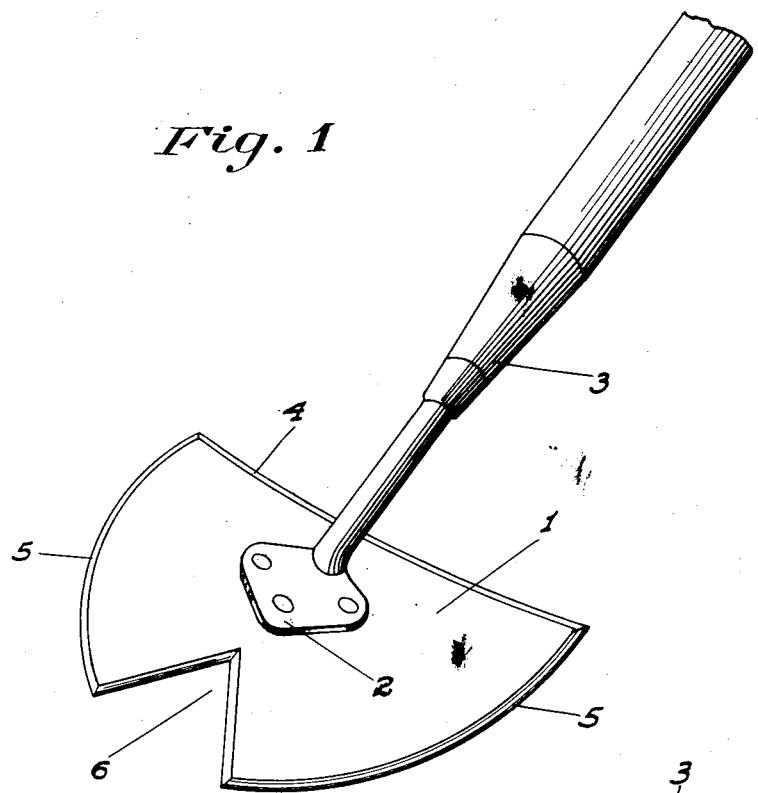
Fig. 1 is a perspective elevation of the hoe.

The rear edge 4 of the blade is straight and extends in a plane at right angles to the longitudinal plane of the handle. The side edges 5 of the blade converge sharply toward each other from the rear edge, and preferably follow curved lines, as shown in Fig. 1

Cut in the blade from the forward edge thereof is a deep V-shaped notch 6 symmetrically alined with the longitudinal axis of the blade and handle. All edges of the blade and the sides of the notch are downwardly beveled, as shown, to form sharp cutting edges. Such beveling of the rear edge however may be omitted if desired.

The hoe in operation is pushed back and forth and it will be noticed that with the forward movement of the hoe any weeds or the like engaged either by the side edges of the blade or between the edges of the notch will be cut off with a shearing action rather than by a straight cutting pressure. This of course increases the ease of operation by lessening the pressure necessary to effect such cutting. The notch is particularly valuable in cutting weeds between plants, since it eliminates the chance of the implement sliding laterally when thus engaging a tough rooted weed and prevents the sides of the blade contacting with the plant and possibly damaging the same.

Two sharp and transversely spaced points or teeth are formed by the junction of the notch edges with the converging sides of the blade. This arrangement promotes ease of digging or cultivating in the dirt, since these points easily penetrate the dirt even though it be somewhat hard.

The concavity of the blade makes the same easy to push, since it rides easily on the ground. By tilting the blade slightly one way or the other any cutting edge may be selectively engaged with the ground, the depth to which the blade thus enters the ground without resistance being controlled by the angle of tilt, as will be evident. At the same time the blade is supported from the ground just as much in an angled position as when it is horizontally disposed.

The angle of the handle relative to the blade makes it easy to operate the hoe without the worker stooping over, and the form and location of the connecting means between the handle and the blade balances and strengthens the blade and eliminates much of the uneven strain to which hoes of ordinary construction are subjected when in operation.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what

I claim as new and useful and desire to secure by Letters Patent is:

1. A hoe comprising a blade having a centrally disposed V shaped incision in its forward edge, the rear edge of the blade being wider than said incision and extending in a transverse plane at right angles to a line bisecting the incision and the side edges of the blade being sharpened and curving inwardly from the rear edge to a junction with the side edges of the incision, and a handle projecting upwardly and at a rearward angle from the blade.

2. A structure as in claim 1, in which the blade is convexly and flatly curved relative to the ground both longitudinally and transversely.

In testimony whereof I affix my signature.

GEORGE H. MILLER.